United States Patent

[11] 3,575,631

| [72] | Inventor | Lawrence W. Pratt<br>Amherst, N.Y. |
|---|---|---|
| [21] | Appl. No. | 807,571 |
| [22] | Filed | Mar. 15, 1969 |
| [45] | Patented | Apr. 20, 1971 |
| [73] | Assignee | Niagara Machine & Tool Works<br>Buffalo, N.Y. |

[54] ELECTRODE FOR ELECTROHYDRAULIC HIGH-ENERGY-RATE METAL FORMING
15 Claims, 2 Drawing Figs.

[52] U.S. Cl...................................................... 313/232,
313/231, 313/235
[51] Int. Cl...................................................... H01j 7/00
[50] Field of Search............................................ 313/231,
232, 235; 72/56

[56] References Cited
UNITED STATES PATENTS
| 1,253,570 | 1/1918 | Berry............................. | 313/325X |
|---|---|---|---|
| 3,486,062 | 12/1969 | Schrom........................ | 313/325X |

*Primary Examiner*—David Schonberg
*Assistant Examiner*—Paul A. Sacher
*Attorney*—Christel & Bean

ABSTRACT: An electrode adapted for use in an electrohydraulic system in which kinetic forces are developed by means of a submerged electrical discharge. An elongated electrode extends axially toward a body of hydraulic fluid and axially through a chamber defined by an annular conducting member and a generally conical insulator. A plurality of arc-initiating members extend radially inwardly from the annular member. The elongated electrode includes a first arc-initiating enlargement and a second, axially-spaced enlargement which acts as a shield for the insulator, the enlargements being disposed axially at opposite sides of the arc-initiating electrodes.

INVENTOR.
LAWRENCE W. PRATT

ELECTRODE FOR ELECTROHYDRAULIC HIGH-ENERGY-RATE METAL FORMING

BACKGROUND OF THE INVENTION

This invention relates to novel means for forming metal by high-energy rate forces produced by electrohydraulic means. These high-energy rate forces are developed by means of a submerged electrical discharge and the present invention relates particularly to novel electrode means for use in such electrohydraulic apparatus.

In recent times there has been considerable activity in the development of electrohydraulic machines for forming sheet metal, particularly in instances where extremely high forming pressures are required for instance in forming titanium, columbium and stainless steel alloy sheets and in the forming of intricate shapes and deep formations in other metal sheets.

Metal forming of the electrohydraulic type is carried on generally as shown in Felts Pat. No. 3,273,365 dated Sept. 20, 1966 which shows a female die and a chamber for holding hydraulic fluid disposed in opposition to the cavity of the female die. The work sheet is placed between the female die and the hydraulic chamber and high electrical energy forces are released in the hydraulic medium in the chamber to form the metal workpiece against and into the female cavity of the die.

While various shapes may be employed for the hydraulic chamber, the generally conical chamber shown in the aforesaid Felts patent is typical and the present invention is particularly applicable to chambers of this general form. As shown in the Felts patent, an electrode is disposed coaxially in the apex of the conical chamber and it discharges electrically to the adjacent surrounding walls of the chamber which are grounded to the machine frame. The coaxial electrode is insulated from the remainder of the machine frame and particularly from the walls of the chamber by a suitable dielectric bushing.

The high energy forces released by the submerged electrical discharges which furnish the energy for metal forming in machines of this class are such as to cause the electrodes to deteriorate at an extremely rapid rate, due to the high heat energy released and the shock forces incident to the electrohydraulic discharge.

The present invention provides a novel electrode structure for use in electrohydraulic metal forming machines which employ this submerged arc principle for high energy rate metal forming.

SUMMARY OF THE INVENTION

The electrode of the present invention and the portion of the hydraulic chamber which cooperates with the electrode to form the electric discharge gap are so arranged that the electrode extends axially toward the body of hydraulic fluid and axially through a generally cylindrical chamber which forms a lower portion of the hydraulic chamber and includes ground electrode members which extend radially inwardly toward the aforesaid electrode, the latter having enlargements above and below the ground electrodes for controlling the direction of the radial discharge of energy from the central electrode to the ground electrode when the system fires. The geometry of the chamber is such as to direct shock waves away from portions of the electrode susceptible to relatively rapid deterioration by these forces.

DESCRIPTION OF THE PREFERRED EMBODIMENT

Figure 1:
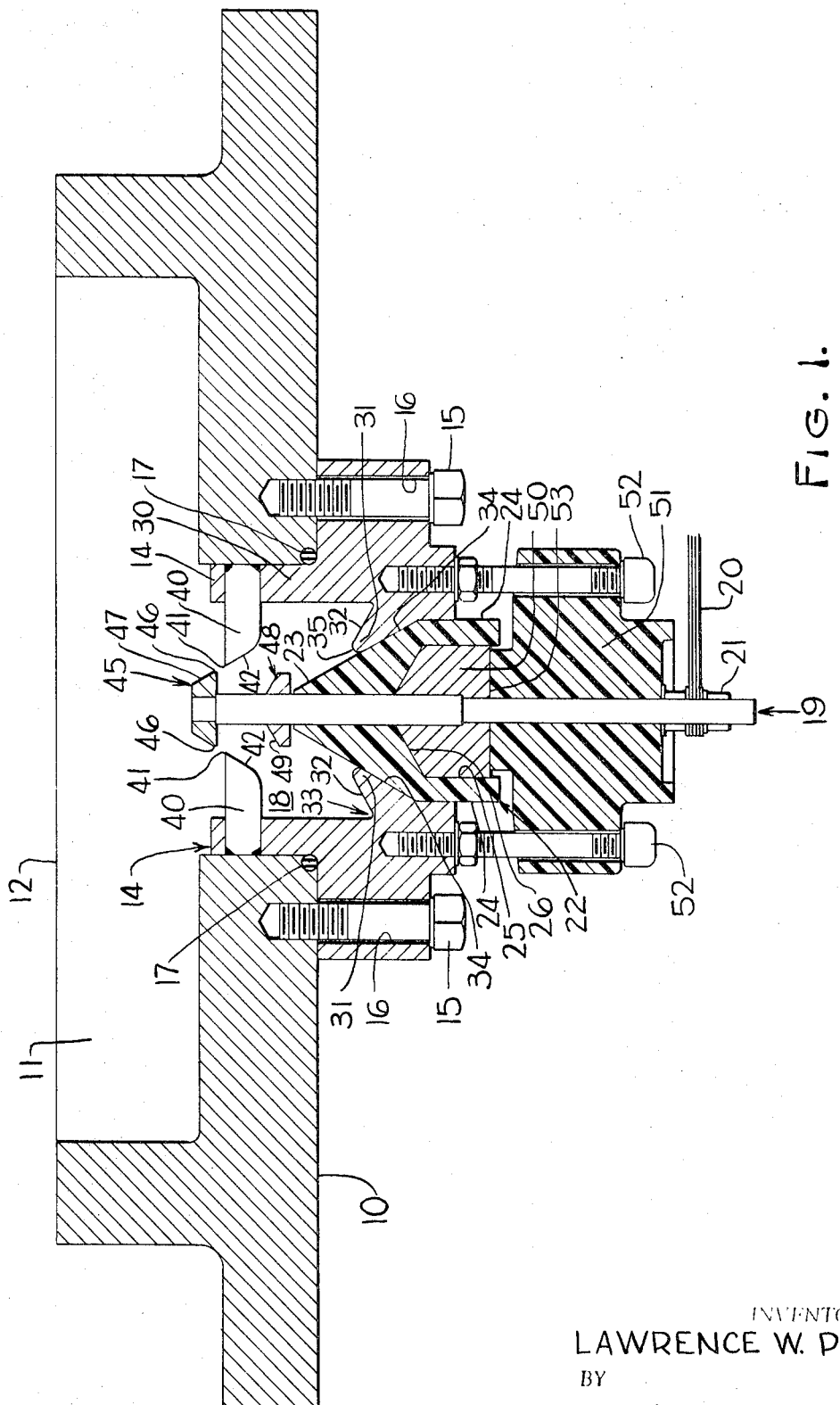
FIG. 1 is a general vertical cross-sectional view taken axially through the electrohydraulic chamber and the novel electrode means of the present invention.

In FIG. 1 the numeral 10 designates a portion of a sheet metal forming machine structure which is generally circular and forms a relatively flat cylindrical chamber 11 for containing hydraulic fluid which may be merely distilled water. While reference has been had above to the Felts patent which shows a generally conical hydraulic chamber, this configuration is of no special importance and the relatively flat cylindrical chamber 11 of the present embodiment is efficient and effective.

The upper end of the cylindrical chamber 11 is designated 12 in FIG. 1 and a diaphragm for containing the liquid in the chamber may be secured across the top of the surface 12 or the surface may be open and the sheet metal workpiece may be laid directly on the surface 12 prior to the forming step. It is to be understood that a female die which is movable downwardly against member 10 after the workpiece has been placed in position is provided as generally illustrated in the Felts patent.

Figure 2:
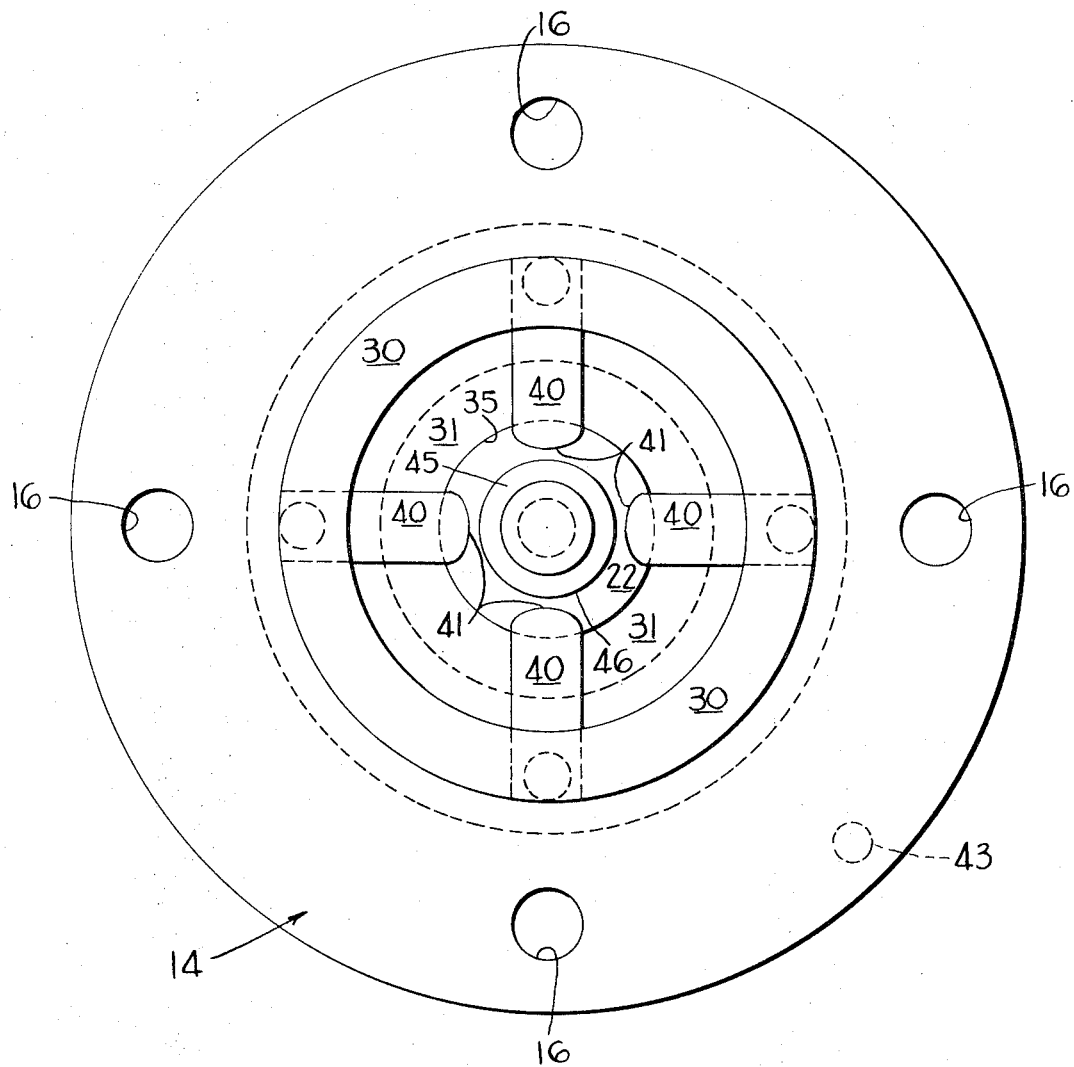
FIG. 2 is a top plan view of the structure of FIG. 1.

An annular member 14 of electrically conducting material is set into an axial opening in the lower end of member 10 and secured therein by screws 15 extending through apertures 16 provided in member 14 as illustrated also in FIG. 2. An O-ring 17 is included between member 14 and member 10 as shown in FIG. 1 to insure a leak-proof connection of the two members. The annular member 14 together with electrode components which will presently be described, define a chamber 18 which forms a lower portion of the hydraulic chamber 11 within which the actual arc which produces the high energy rate release takes place.

The electrode structure further comprises an elongated or rodlike member 19 of electrically conducting material, for example, steel. One end of conductor member 19 extends through chamber 18 and into chamber 11 as shown in FIG. 1. A first electrical potential, preferably a relatively high voltage, is applied to conductor member 19 and in this particular illustration by means of a stranded cable 20 and connector 21 which is secured to the other end of conductor 19. Cable 20 is connected to a suitable source of high voltage, it being understood that the electrode of the present invention is readily adaptable for use with all varieties of such sources, none of which sources are intended to be included within the spirit and scope of this invention.

A member 22 of electrically insulating material, for example, a urethane resin, is also included in the electrode and has a generally conical shape. The insulating member 22 is provided with an axial bore therethrough of a diameter substantially equal to that of conductor member 19. Member 22 is disposed with its apex in chamber 18 and located so as to embrace conducting member 19 along a portion of the axial length thereof but to leave exposed and hence uninsulated a portion of conductor 19 which extends into chamber 18. The outer surface 23 of member 22 extends, for at least a major portion thereof, in a direction from the exposed portion of conductor member 19 at an acute angle with respect to the axis of members 19 and 22 along the portion embraced thereby.

As seen in FIG. 1, the portion of surface 23 exposed to fluid in chamber 18 thus is disposed so as to deflect forces incident thereon outwardly as will be explained in more detail further on in the specification. The surface 23 terminates in a cylindrical surface portion 24 in the region of the base or enlarged end portion of member 22. A relatively large diameter bore 25 is provided in member 22 at its base and terminates in a conical surface 26. The purpose of bore 25 will be explained further on in the specification.

The annular conducting member 14 includes a first portion 30 which is disposed generally concentric with respect to the portion of elongated conductor 19 which is exposed to or contacted by the liquid medium in chambers 11 and 18. The inner diameter of portion 30 is large enough so as to be spaced from member 19, and the outer diameter is such that member 14 may be fitted into the opening in member 10. The annular conducting member 14 also includes a second portion 31 which extends inwardly toward members 19 and 22.

As shown in FIG. 1, portion 31 includes a first surface 32 which is frustoconical to define an annular, generally V-shaped pocket designated 33, the function of which presently will be described. Portion 31 further includes a second surface 34 which is internally conical so as to fit against a portion of surface 23 of insulating member 22, the arrangement being such that surface 23 of member 22 is exposed to the liquid medium in chamber 18 between the exposed end of conductor 19 and the portion 31 of annular conducting member 14 as illustrated in FIG. 1. The surfaces 32 and 34 meet in a transition surface 35 which is smooth or rounded so as to be arc-inhibiting.

The aforementioned chamber 18 is thus completely defined by the arrangement of electrode components described. The arrangement is such that conductor member 19 is firmly embraced by insulating member 22 which in turn is firmly embraced by the inwardly extending portion 31 of annular conducting member 14 which is attached to member 10. Conductor member 19 and insulating member 22 are secured to member 14 by an arrangement which will be described so as to provide a rugged but easily disassembled complete electrode structure. In addition, the geometry of chamber 18 is such as to direct shock waves away from the portions of the electrode susceptible to relatively rapid deterioration by these forces, as will be described in detail further on in the specification.

The electrode structure provided by the present invention further includes a plurality of arc-initiating members 40 extending radially from the annular conducting member 14 into chamber 18 and, hence, toward the exposed portion of conductor member 19. In this illustration four arc-initiating members spaced circumferentially at 90° intervals are shown in FIG. 2, but fewer or more members may be employed. It has been found desirable, however, to provide an even number of the members 40 equally spaced about the axis of conductor member 19 so as to distribute evenly the wear on member 19 as well as to prevent bending thereof.

Each of the members 40 is formed from electrically conducting material, for example cold-rolled steel, and is provided at its inner end with a relatively sharp, arc-initiating portion 41 and a relatively smooth arc-inhibiting portion 42. As shown in FIG. 1, each of members 40 is disposed so that arc-initiating portion 41 is closer to chamber 11 than is arc-inhibiting portion 42 which, in turn, is closer to insulator member 22. Each of the members 40 is secured suitably to portion 30 of annular conducting member 14. For example, a plurality of bores, equal in number to that of members 40, can be provided circumferentially in portion 30 of member 14. Members 40 would then be secured in the corresponding bores, as shown in FIGS. 1 and 2, securement being provided by welding. The ends received in the bores should be chamfered so as to insure a complete weld.

The annular conducting member 14 is connected to an electrical potential different from that to which conductor member 19 is connected; preferably member 14 is connected to ground. This is accomplished by a separate grounded cable and connection thereof to member 14, indicated schematically at 43 in FIG. 2, so as to prevent the hazardous flow of current through the machine member 10. With this preferred arrangement, conductor member 19 is thus a high potential electrode and the arc-initiating members may be considered ground electrodes.

Elongated conducting member 19 is provided with a first enlargement 45 of electrically conducting material, such as steel. Enlargement 45 is annular and provided with a relatively sharp, arc-initiating edge portion 46 and a relatively smooth surface 47 which is disposed so as to direct forces incident thereon generally away from the electrode structure. Conductor member 19 is provided with a second enlargement 48 which is located on member 19 axially between extension 45 and insulating member 22. Enlargement 48 also is annular and has a relatively smooth, force-deflecting surface 49, the purpose being to shield insulating member 22 in a manner which presently will be described. The conductor member 19 and enlargements 45, 48 are secured together as for example by silver brazing techniques.

The electrode structure of the present invention is completed by a plug or reinforcing member 50 of steel or similar rigid material which fits within bore 25 and conical surface 26. The member 50 is provided with an axial bore therethrough to receive conductor member 19. In combination with reinforcing member 50 there is provided a member 51 of electrically insulating material having an axial bore therethrough adapted to receive conductor 19 and attached to annular member 14 by means of cap screws 52. Member 51 has an axially extending portion 53 which abuts reinforcing member 50, and when member 51 is firmly connected to member 14, member 50 is urged against the base of insulator 22 in a direction parallel to the axis thereof so as to enhance the mechanical rigidity and liquid-tight nature of the electrode structure.

When a relatively high voltage is applied to conductor 19 an electrical arc will occur in the gap between the annular edge 46 of member 45 and surface 41 of each of the members 40. The arc releases a tremendous force which is reflected in the liquid medium in chambers 18 and 11 as an expansive force which forms the metal workpiece against the die. The manner in which electrical energy is applied to the electrode together with suitable control arrangements are readily understood by those working in this area and, moreover, one particular arrangement is shown in the aforementioned Felts patent so that a detailed description herein is deemed unnecessary.

Arcing desirably is confined to the aforementioned gap by virtue of the close proximity between the sharp edge portions 41 of the members 40 and the sharp edge portion 46 of enlargement 45. The inclined surface 47 of enlargement 45 functions to direct the shock waves resulting from the electrical discharge upwardly and outwardly from the electrode and generally toward the workpiece and die which are in opposition to chamber 11. The plurality of arc-initiating members distributed circumferentially around the edge 46 of annular enlargement 45, together with the annular force-directing surface 47 advantageously provides a uniformly distributed and directed force through the liquid medium to the workpiece and die. From the standpoint of metal forming applications, a plurality of symmetrically distributed submerged discharges appear to provide significant operational advantages over a single discharge.

The arc-inhibiting surface 42 of each of the members 40 tends to confine the arc discharge to the aforementioned gap. In particular, the slope of surface 42 prevents arcing between the members 40 and enlargement 48 which is positioned axially on rod 19 closer electrically than enlargement 45 to the source of high voltage.

A significant limitation of electrodes heretofore available has been the relatively rapid deterioration of the insulating material necessitating inconvenient and expensive replacement, often of the entire electrode. The initial shock waves or forces released by the submerged arc discharge travel throughout the liquid medium, both toward the workpiece and toward the electrode. The problem is enhanced by any waves which are reflected back toward the electrode. The insulator, being of relatively brittle material such as urethane resin, is the weakest portion of the electrode structure and thus subject to rapid deterioration by these forces.

The electrode of the present invention is designed so that such forces or shock waves are dissipated or directed away from the insulator included therein. The enlargement 48 on conductor member 19 diverts forces or shock waves in chamber 18 away from insulator member 22. Surface 49, being annular and disposed preferably at a 30° angle with respect to a plane perpendicular to the axis of member 19, directs forces incident thereon upwardly and outwardly toward the surrounding wall provided by member 14 and hence away from insulator 22. Surface 23 of insulator 22, being inclined preferably at a 30° angle with respect to the axis thereof, precludes any head-on impact of shock waves and also tends to deflect incident shock waves or forces radially outwardly and upwardly.

The force receiving pocket 33 dissipates forces diverted thereto and others traveling in chamber 18. Arcing between portion 31 of conducting member 14, which partially defines this pocket, and enlargement 48 is prevented by the smooth transition surface 35. The steel plug 50 firmly abutting insulator 22 aids in withstanding shock waves and forces by enhancing the rigidity of the electrode structure.

The electrode of the present invention is thus not subject to the relatively rapid deterioration of the insulator included therein as in the case of prior electrode structures. Moreover, the electrode advantageously may utilize electrically insulating materials heretofore considered impractical because of the deterioration problem. The electrode of the present invention was found to perform well in the energy range of about 10—50 kilojoules. Another significant advantage is the fact that the present electrode structure is not a bonded structure, thus facilitating ease of assembly and disassembly should any of the components thereof require replacement.

I claim:

1. An electrode structure for use in an electrohydraulic system to produce high energy forces by means of an electrical discharge in a liquid medium, said electrode structure comprising:
   a. an elongated member of electrically conducting material, one end of which is in said liquid medium;
   b. a member of electrically insulating material embracing said elongated member along a portion of the axial length thereof, said insulating member having an outer surface inclined relative to the axis of said elongated member whereby shock waves incident on said outer surface are directed outwardly away from said elongated member;
   c. an annular member of electrically conducting material embracing a portion of said insulating member and defining an open chamber having an inner surface contacted by said liquid medium and circumferentially surrounding the exposed, uninsulated portion of said elongated member in spaced relation therefrom;
   d. means for applying to said elongated member and said annular member different electrical potentials;
   e. a plurality of arc-initiating electrode members extending from the inner surface of said annular member inwardly toward said elongated member, each of said electrode members having a relatively sharp edge disposed toward said elongated member;
   f. an annular enlargement on said elongated member in contact with said liquid medium and spaced axially from said insulating member and extending in a radial outward direction toward said arc-initiating electrode members, said enlargement provided with a relatively sharp, arc-initiating edge portion relatively close to said arc-initiating electrode members and provided further with a relatively smooth portion disposed so as to direct forces generally away from said electrode structure;
   g. means on said elongated member spaced from said annular enlargement and near said insulating member for diverting forces away from said insulating member; and
   h. a force receiving pocket formed by and located on said inner surface of said annular conducting member proximate said insulating member for dissipating forces traveling thereto.

2. The electrode structure as defined in claim 1 wherein each of said arc-initiating electrode members is secured at its outer end to said annular conducting member and provided at its inner end with a relatively sharp, arc-initiating portion and a relatively smooth arc-inhibiting portion.

3. The electrode structure as defined in claim 1 wherein said means on said elongated conducting member for diverting forces comprises a second radial enlargement axially positioned between said first enlargement and said insulating member and provided with a relatively smooth surface disposed so as to deflect forces away from said insulating member.

4. The electrode structure as defined in claim 1 wherein said arc-initiating electrode members are equally spaced circumferentially around the axis of said elongated conducting member.

5. The electrode structure as defined in claim 1 wherein the outer surface of said insulating member extends in a direction from the exposed portion of said elongated member at an acute angle relative to the axis of said elongated member along the portion embraced thereby.

6. The electrode as defined in claim 1 wherein said annular conducting member includes:
   a. a first portion disposed generally concentric with respect to the exposed portion of said elongated conducting member and spaced therefrom; and
   b. a second, inwardly extending portion having a first surface communicating with said first portion and a second surface disposed so as to coincide with and embrace a portion of said insulating member outer surface.

7. The electrode structure as defined in claim 6 wherein the first and second surfaces of said inwardly extending portion meet in a smooth transition surface.

8. The electrode structure as defined in claim 6 wherein the first surface of said inwardly extending portion is disposed at an acute angle relative to the inner surface of said first portion so as to define therewith said annular force receiving pocket.

9. The electrode structure as defined in claim 8 wherein each of said arc-initiating electrode members is secured at its outer end to said annular conducting member and provided at its inner end with a relatively sharp, arc-initiating portion and a relatively smooth arc-inhibiting portion.

10. The electrode structure as defined in claim 9 wherein said means on said elongated conducting member for diverting forces comprises a second radial enlargement axially positioned between said first enlargement and said insulating member and provided with a relatively smooth surface disposed so as to deflect forces away from said insulating member.

11. The electrode structure as defined in claim 10 wherein said arc-initiating electrode members are spaced equally circumferentially around the axis of said elongated conducting member.

12. The electrode structure as defined in claim 1 wherein said insulating member is provided with a bore in the end opposite that near the exposed portion of said elongated conducting member, said bore extending along a portion of the axial length of said member and terminating in an internally conical surface.

13. The electrode structure as defined in claim 12 further including a reinforcing element embracing said elongated conducting member and snugly received in said bore in said insulating member.

14. The electrode structure as defined in claim 13 further including an additional insulating member embracing said elongated conducting member and located axially thereon so as to abut said reinforcing element together with means connecting said additional insulating member to said annular conducting member.

15. In an electrohydraulic system including a chamber containing a liquid medium, an electrode structure for producing high energy forces by means of an electrical discharge in the liquid medium, said electrode structure comprising:
   a. an elongated member of electrically conducting material, one end of which extends through an opening in said chamber so as to be within said liquid medium;
   b. means for applying to said elongated member a relatively high electrical potential;

c. a member of electrically insulating material embracing said elongated member along a portion of the axial length thereof spaced from the portion contacted by said liquid medium a portion of said insulating member being contacted by said liquid medium, said insulating member having an outer annular surface extending at an acute angle relative to the axis of the elongated member along the portion embraced thereby whereby shock waves incident on said outer surface are directed outwardly away from said elongated member;

d. an annular member of electrically conducting material embracing a portion of said outer surface of said insulating member and having an inner surface contacted by said liquid medium and circumferentially surrounding the portion of said elongated conducting member contacted by said liquid medium and in spaced relation therefrom, said last-mentioned annular member also being positioned in the opening in said chamber;

e. means for applying to said annular member ground electrical potential;

f. a plurality of arc-initiating electrode members extending from the inner surface of said last-mentioned annular member toward said elongated member, each of said arc-initiating members being provided at the end thereof near said elongated member with a relatively sharp, arc-initiating portion and a relatively smooth arc-inhibiting portion;

g. a first annular enlargement on the portion of said elongated member contacted by the liquid and provided with a relatively sharp, arc-initiating portion near the arc-initiating portion of said arc-initiating members and with a relatively smooth portion disposed so as to direct forces generally away from said electrode structure;

h. a second annular enlargement on said elongated member between said first enlargement and said insulating member and provided with a relatively smooth surface disposed so as to deflect forces away from said insulating member; and i. a force receiving pocket formed by and located on said inner surface of said annular conducting member proximate said insulating member for dissipating forces traveling thereto.